(12) United States Patent
Chang et al.

(10) Patent No.: US 7,436,462 B2
(45) Date of Patent: Oct. 14, 2008

(54) LIQUID CRYSTAL DISPLAY PANEL

(75) Inventors: Chia-Hao Chang, Taoyuan (TW);
Ju-Yu Lee, Taoyuan (TW)

(73) Assignee: AU Optronics Corp., Hsinchu (TW)

( * ) Notice: Subject to any disclaimer, the term of this patent is extended or adjusted under 35 U.S.C. 154(b) by 244 days.

(21) Appl. No.: 11/469,111

(22) Filed: Aug. 31, 2006

(65) Prior Publication Data

US 2008/0007676 A1 Jan. 10, 2008

(30) Foreign Application Priority Data

Jul. 4, 2006 (TW) .............................. 95124281 A

(51) Int. Cl.
*G02F 1/1368* (2006.01)
*G02F 1/1343* (2006.01)

(52) U.S. Cl. ..................... 349/42; 349/106; 349/139; 349/149

(58) Field of Classification Search ............ 349/42, 349/43, 73, 106, 149, 139, 143; 257/59, 257/72; 345/92; 438/30
See application file for complete search history.

(56) References Cited

U.S. PATENT DOCUMENTS

| | | | | |
|---|---|---|---|---|
| 6,933,162 B2 * | 8/2005 | Sun | ............................ | 438/30 |
| 7,142,279 B2 * | 11/2006 | Tak et al. | .................... | 349/187 |
| 2004/0164943 A1 * | 8/2004 | Ogawa et al. | ................. | 345/92 |

* cited by examiner

*Primary Examiner*—Dung T. Nguyen
*Assistant Examiner*—Tai Duong
(74) *Attorney, Agent, or Firm*—J.C. Patents

(57) ABSTRACT

A liquid crystal display panel including an active device array substrate, an opposite substrate, a plurality of patterned electrodes, and a liquid crystal layer is provided. The active device array substrate includes a substrate, a plurality of scan lines, a plurality of data lines, and a plurality of pixel units. The substrate mentioned has a plurality of shots. The scan lines, data lines, and pixel units are all disposed on the substrate. Additionally, the opposite substrate is disposed above the active device array substrate, and the plurality of patterned electrodes is disposed on the opposite substrate. The liquid crystal layer is disposed between the patterned electrodes and the active device array substrate.

12 Claims, 5 Drawing Sheets

LIQUID CRYSTAL DISPLAY PANEL

CROSS-REFERENCE TO RELATED APPLICATION

This application claims the priority benefit of Taiwan application serial no. 95124281, filed on Jul. 4, 2006. All disclosure of the Taiwan application is incorporated herein by reference.

BACKGROUND OF THE INVENTION

1. Field of Invention

The present invention relates to a display apparatus. More particularly, the present invention relates to a liquid crystal display panel capable of improving display quality.

2. Description of Related Art

Due to the progress of semiconductor devices or display apparatuses, current multimedia technology is well developed. Among displays, thin film transistor liquid crystal displays (TFT LCD) characterized in high picture quality, good space utilization, low power consumption, and no radiation etc. have gradually become mainstream products in the market.

An common TFT LCD is mainly constituted of a TFT array substrate, a color filter substrate, and a liquid crystal layer sandwiched between the above two substrates. The TFT array substrate has a plurality of pixel electrodes disposed thereon, the color filter substrate has a common electrode layer disposed thereon, and the liquid crystal layer is controlled by the electric field between the pixel electrodes and the common electrode layer. The TFT array substrate is mainly formed by a mask process. For example, in the conventional five mask processes, the first mask process mainly defines the gate and scan line; the second mask process mainly defines the channel layer; the third mask process mainly defines the source, drain, and data line; the fourth mask process mainly defines the passivation layer; and the fifth mask process mainly defines the pixel electrode.

However, currently, the exposure method adopted in a mask process is mainly achieved by the use of a stepper or scanner. Referring to FIG. 1, as for a stepper, when the dimension of the mask is smaller than a substrate 110, the substrate 110 must be divided into a plurality of shots 10 for performing several exposures to complete exposing the entire region required on the substrate 110. For example, a 12-inch or 14-inch substrate must be exposed four times, and a 15-inch or 17-inch substrate 110 must be exposed six times. It should be noted that the more the shot 10 is, the easier the alignment offset between the shots 10 occurs. Therefore, the film layers formed at different positions in the shots 10 may have offset to some extent.

FIG. 2 is a partial schematic view of the pixel structure on a conventional TFT array substrate. Referring to FIG. 2, a conventional pixel structure 100 mainly comprises a TFT 122, a pixel electrode 124, a scan line 126, and a data line 128. The pixel electrode 124 is electrically connected to the corresponding scan line 126 and data line 128 through the TFT 122. It should be noted that a region 20 overlapped by a gate 122g and a drain 122d together with a region 30 overlapped by the pixel electrode 124 and the scan line 126 generates a gate-drain parasitic capacitance $C_{gd}$ effect, and the value of the gate-drain parasitic capacitance $C_{gd}$ is in direct proportion to the area of the regions 20, 30.

Generally, when fabricating the TFT, due to factors such as errors in the alignment of the mask or vibration, the area of the regions 20, 30 respectively overlapped by the gate 122g and drain 122d changes. As a result, the value of the gate-drain parasitic capacitance $C_{gd}$ varies in the shots 10 at different positions. However, the value of the gate-drain parasitic capacitance $C_{gd}$ may directly affect the pixel feedback voltage used for driving the liquid crystal molecules. If the difference between the pixel feedback voltages in shots 10 at different positions is too great, a problem of shot mura may occur to the display frame of the TFT LCD at the edges of the shots.

SUMMARY OF THE INVENTION

The objective of the present invention is to provide a liquid crystal display panel, so as to solve the problem of shot mura due to shots in the conventional TFT LCD.

In order to fulfill the above or other objectives, the present invention provides a liquid crystal display panel, which comprises an active device array substrate, an opposite substrate, a patterned electrode, and a liquid crystal layer. The active device array substrate comprises a substrate, a plurality of scan lines, a plurality of data lines, and a plurality of pixel units. The substrate has a plurality of shots. The scan lines and data lines are disposed on the substrate. Additionally, the pixel units are arranged on the substrate in arrays. The opposite substrate is disposed above the active device array substrate, the plurality of patterned electrodes is respectively disposed on the opposite substrate, and the juncture of at least a portion of the shots corresponds to the juncture of the patterned electrodes. The liquid crystal layer is disposed between the patterned electrodes and the active device array substrate.

In an embodiment of the present invention, the patterned electrodes are respectively connected to different reference voltages.

In an embodiment of the present invention, the liquid crystal display panel further comprises a plurality of conductive paste dots disposed on the side edges of the patterned electrodes, and the patterned electrodes are electrically connected to the external circuit via the conductive paste dots.

In an embodiment of the present invention, the material of the conductive paste dot comprises silver paste or carbon paste.

In an embodiment of the present invention, the pixel unit comprises at least one active device and a pixel electrode, wherein the pixel electrode is electrically connected to the corresponding scan line and data line via the active device.

In an embodiment of the present invention, the opposite substrate further comprises a base, a black matrix, and a plurality of color filter thin films. The black matrix is disposed on the base and has a plurality of lattice points. The color filter thin films are disposed on the base and respectively in the lattice points.

In an embodiment of the present invention, the material of the color filter thin film comprises red, blue or green resins.

In an embodiment of the present invention, the opposite substrate is a transparent substrate.

In an embodiment of the present invention, if the opposite substrate is a transparent substrate, the liquid crystal display panel further comprises a color filter disposed on the active device array substrate, and the liquid crystal layer is disposed between the color filter and the opposite substrate.

In an embodiment of the present invention, the material of the patterned electrode comprises indium tin oxide (ITO), indium zinc oxide (IZO), or aluminum zinc oxide (AZO).

In an embodiment of the present invention, the liquid crystal display panel further comprises a buffer film layer disposed between two shots.

In an embodiment of the present invention, the material of the buffer film layer comprises N-type doped amorphous silicon.

The opposite substrate of the present invention has a plurality of patterned electrodes disposed thereon, and the patterned electrodes are connected to different reference voltages. Thus, the voltage difference generated between the pixel electrodes on the active device array substrate and the patterned electrodes can be made consistent by adjusting the reference voltages to which the patterned electrodes are connected. As such, the phenomenon of great difference between the pixel feedback voltages resulting from the alignment offset caused by exposure of the pixel electrodes can be avoided, thereby providing a good display quality of the liquid crystal display panel.

In order to make the aforementioned and other objectives, features and advantages of the present invention comprehensible, preferred embodiments accompanied with figures are described in detail below.

DESCRIPTION OF EMBODIMENTS

Figure 1:
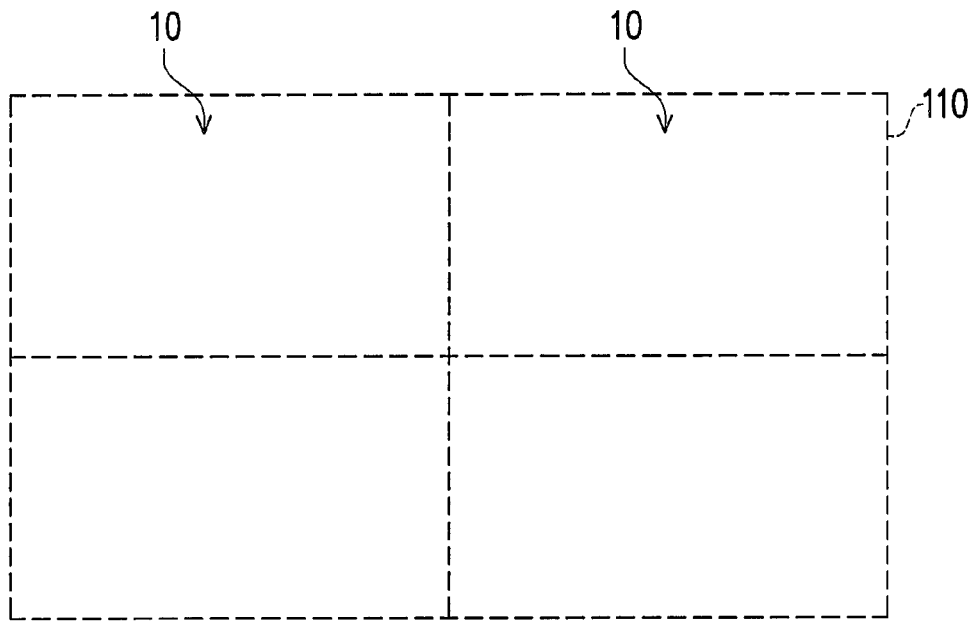
FIG. 1 is a schematic view of the shots on the substrate in the conventional art.
Figure 2:
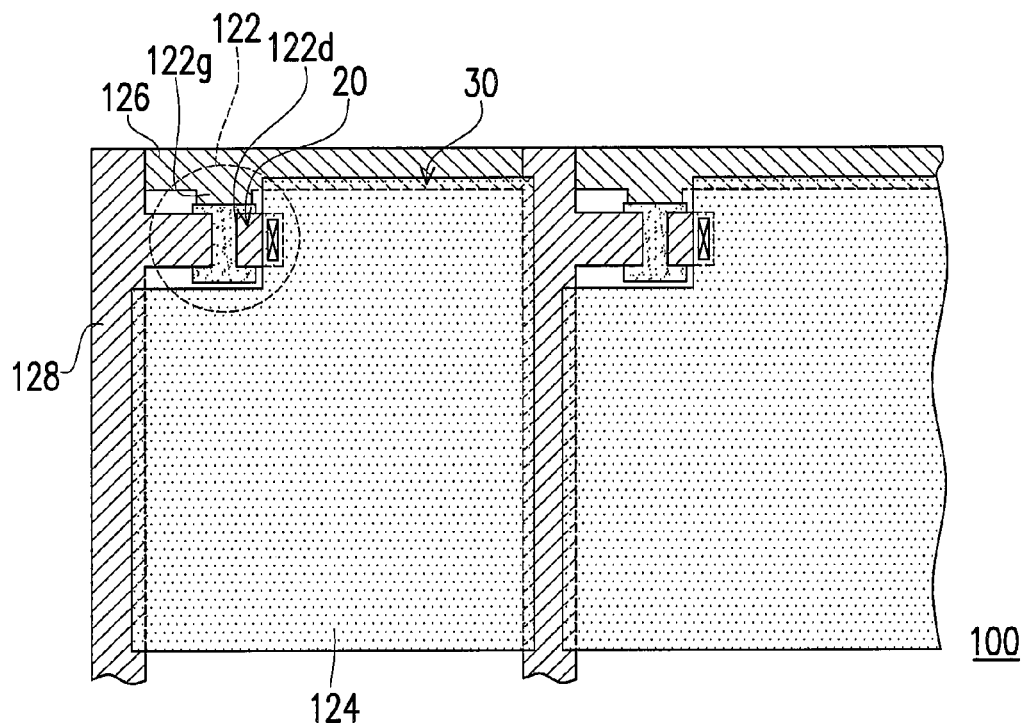
FIG. 2 is a partial schematic view of the pixel structure on the TFT array substrate in the conventional art.
Figure 3:
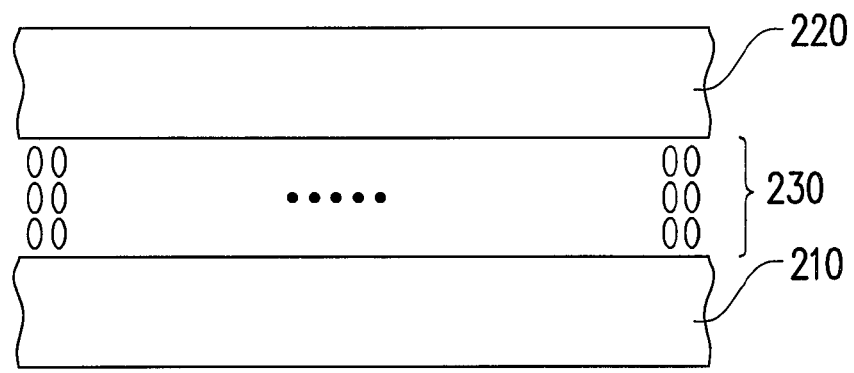
FIG. 3 is a schematic view of the liquid crystal display panel according to the present invention.

FIG. 3 is a schematic view of the liquid crystal display panel according to the present invention. Referring to FIG. 3, a liquid crystal display panel 200 of the present invention comprises an active device array substrate 210, an opposite substrate 220, and a liquid crystal layer 230, wherein the liquid crystal layer 230 is disposed between the active device array substrate 210 and the opposite substrate 220. In particular, the arrangement state of the liquid crystal molecules in the liquid crystal layer 230 is mainly controlled by the pixel feedback voltage generated between the active device array substrate 210 and the opposite substrate 220.

Figure 4A:
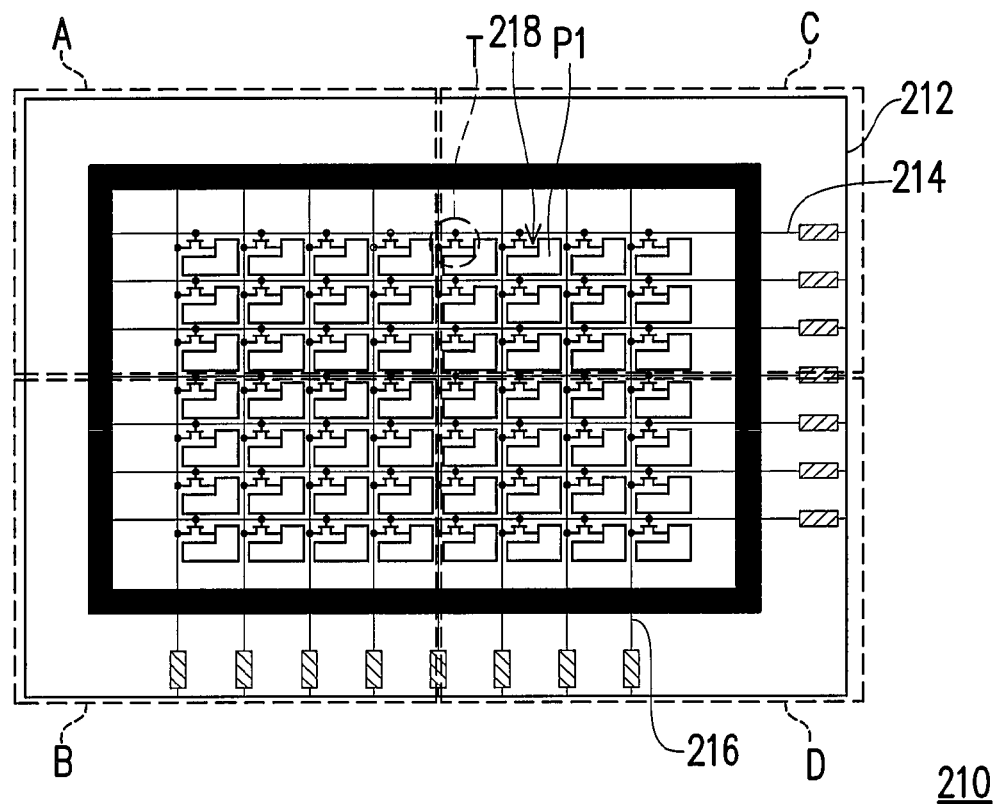
FIG. 4A is a schematic view of the active device array substrate according to the present invention.
Figure 4B:
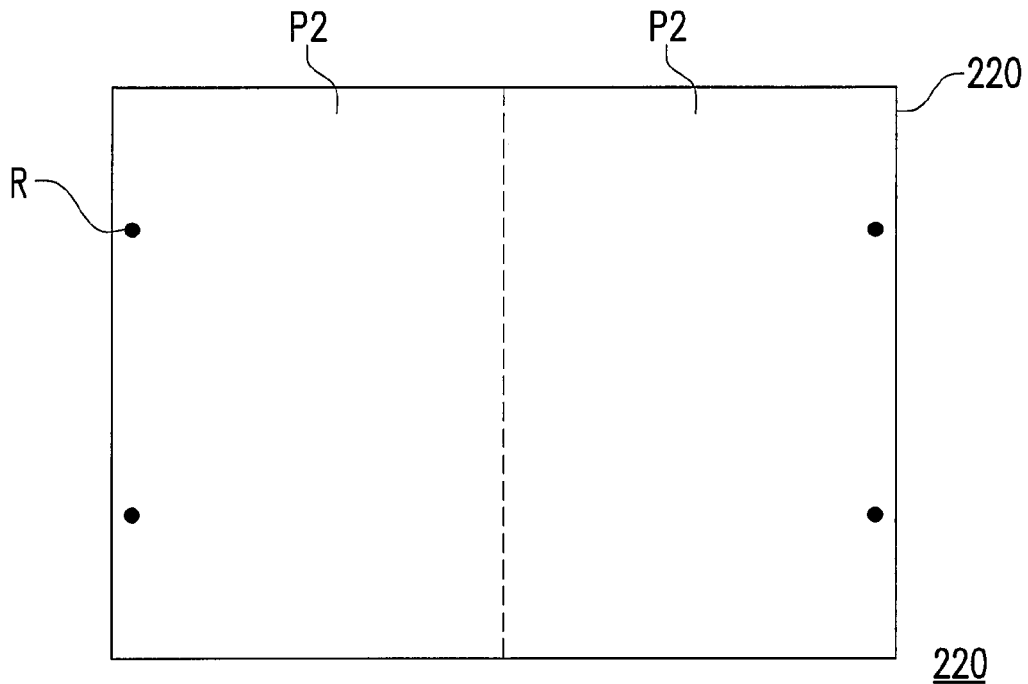
FIG. 4B is a schematic view of the opposite substrate according to the present invention.

FIG. 4A is a schematic view of the active device array substrate according to the present invention. FIG. 4B is a schematic view of the opposite substrate according to the present invention. Referring to FIGS. 4A and 4B, the active device array substrate 210 of the present invention comprises a substrate 212, a plurality of scan lines 214, a plurality of data lines 216, and a plurality of pixel units 218, wherein the substrate 212 has a plurality of shots A, B, C, and D disposed thereon. It should be noted that the number of the shots A, B, C, and D depends on the dimension of the substrate 212 and the dimension of the mask used in the lithography process. Only four shots A, B, C, and D are shown in FIG. 4A for illustration, and the number thereof is not particularly limited herein.

As shown in FIG. 4A, the pixel units 218 are arranged on the substrate 212 in arrays, and the scan lines 214 and data lines 216 mark out the positions of the pixel units 218. Generally speaking, each of the pixel units 218 has at least one active device T and a pixel electrode P1, depending on the design of the performance of the pixel units 218. For example, the pixel unit 218 having the design of pre-charge performance needs more than two active devices T, wherein the number of the active device T in each pixel unit 218 is not particularly limited herein. In addition, the pixel electrode P1 can be made of ITO, IZO, or AZO.

The aforementioned active device T is disposed on the substrate 212, and the pixel electrode P1 is electrically connected to the corresponding scan line 214 and data line 216 through the active device T. In particular, a switch signal transmitted through the scan line 214 turns on the active device T. After the active device T is turned on, a display signal is transmitted into the pixel electrode P1 through the data line 216, thereby generating the pixel feedback voltage together with the electrode (described in detail hereinafter) on the opposite substrate 220.

It should be stressed that, the opposite substrate 220 may have a plurality of patterned electrodes P2 disposed thereon. Though only two patterned electrodes P2 are shown in FIG. 4B, the number of the patterned electrode P2 is not particularly limited herein as long as being more than one. The material of the patterned electrodes P2 can be ITO, IZO, or AZO. The patterned electrodes P2 are respectively disposed on the opposite substrate 220 and are electrically insulated from each other. Further, the juncture of the shots A, B, C, and D corresponds to the juncture of the patterned electrodes P2.

Figure 5:
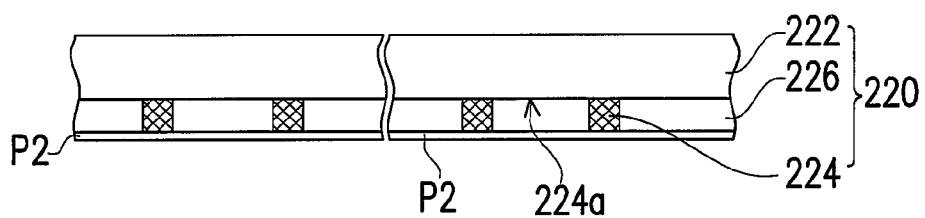
FIG. 5 is a schematic sectional view of the opposite substrate according to the present invention.

Referring to FIG. 5, in particular, the opposite substrate 220 can be a color filter, such that the liquid crystal display panel 200 can achieve the effect of full-color display. The opposite substrate 220 comprises a base 222, a black matrix 224, and a plurality of color filter thin films 226. The black matrix 224 and the color filter thin films 226 are disposed on the base 222, and the black matrix 224 has a plurality of lattice points 224a. The color filter thin films 226 are respectively disposed in the lattice points 224a. Generally speaking, the material of the color filter thin films 226 can be red, blue, or green resins. Further, the black matrix 224 can be made of Cr, black resin or fabricated by stacking red, blue, and green resins.

Figure 6:
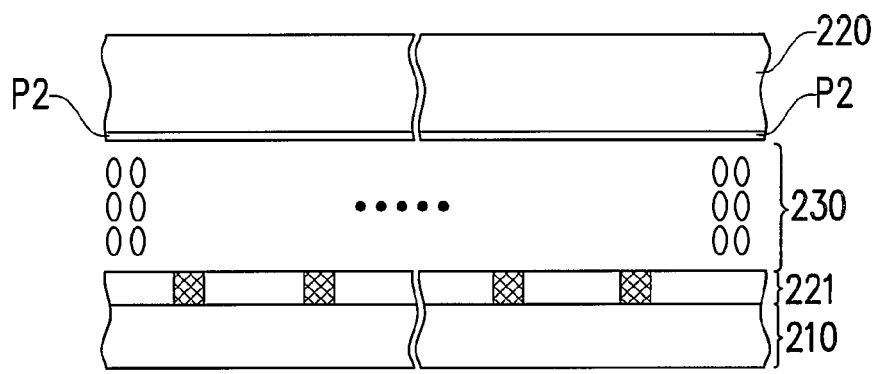
FIG. 6 is another liquid crystal display panel according to the present invention.

Definitely, the opposite substrate 220 can also be a transparent substrate (as shown in FIG. 6). At this time, a color filter on array (COA) technique can be applied to the active device array substrate 210, wherein the COA technique refers to forming a color filter 221 on the active device array substrate 210 and respectively disposing the patterned electrodes P2 on the opposite substrate 220. That is, the liquid crystal layer 230 is disposed between the color filter 221 and the opposite substrate 220.

It should be particularly noted that after being charged, the pixel electrode P1 and the patterned electrodes P2 generate the pixel feedback voltage, thereby driving the liquid crystal molecules. However, it is very likely that the devices formed in different shots A, B, C, and D on the substrate 212 have different electrical properties due to the alignment offset or vibration during the lithography process. As a result, after the pixel electrodes P1 in the shots A, B, C, and D are charged, the quantities of the electric charges are different.

In order to effectively keep the consistency of the pixel feedback voltages, the patterned electrodes P2 can be selectively connected to different reference voltages respectively, so as to maintain the voltage difference generated between the patterned electrodes P2 and the pixel electrodes P1. As such, even if the quantities of the electric charges of the pixel electrodes P1 are different after being charged, the voltage difference between the pixel electrodes P1 in different shots A, B, C, D and the patterned electrodes P2 can be made consistent by adjusting the value of the reference voltage. Compared with only one common electrode layer disposed on the conventional color filter substrate, such that the different shots A, B, C, and D cannot be adjusted, the liquid crystal display panel 200 of the present invention can eliminate the mura phenomenon of the display frame by adjusting the reference voltage, so as to effectively improve the display quality. Definitely, if the active device array substrate 210 is of good quality, the patterned electrodes P2 of the present invention can also be coupled to the same voltage level.

In practice, the patterned electrodes P2 can be selectively connected to the external circuit (not shown), for example, drive chip via a plurality of conductive paste dots R. The drive chip can provide different voltages respectively to the patterned electrodes P2, such that the voltage difference between the patterned electrodes P2 and the pixel electrodes P1 can be well controlled. The conductive paste dots R can be selectively disposed on the side edges of the patterned electrodes P2 for facilitating the electric connection to the external circuit. Generally speaking, the material of the conductive paste dots R can be silver paste or carbon paste.

Figure 7:
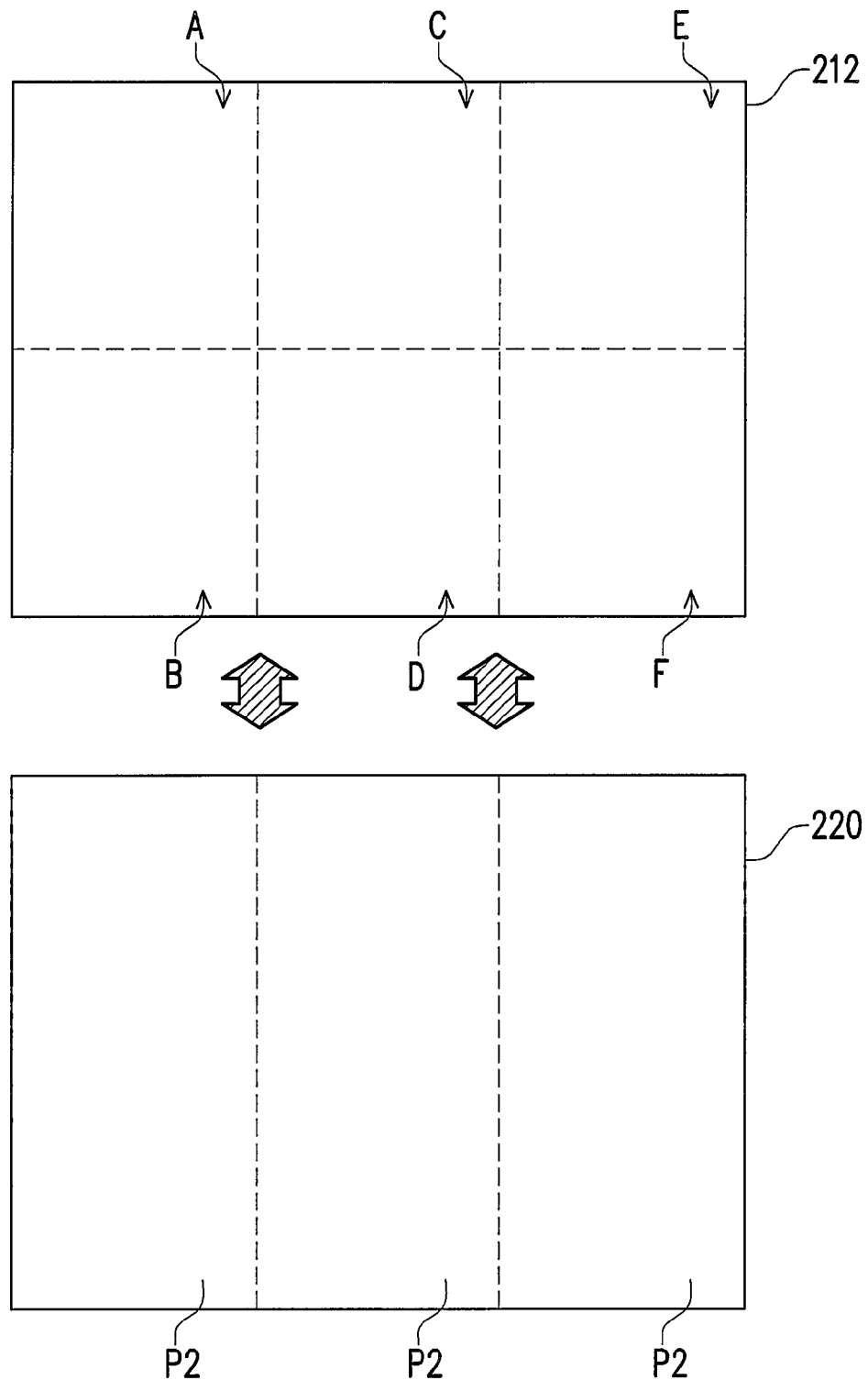
FIG. 7 is a schematic view of the relative position between the shots and the patterned electrodes according to the present invention.

FIG. 7 is a schematic view of the relative position of the shots and the patterned electrodes according to the present invention. Referring to FIG. 7, the substrate 212 can also have six shots A, B, C, D, E, and F disposed thereon. The opposite substrate 220 can have three patterned electrodes P2 disposed thereon. It should be noted that the juncture of the patterned electrodes P2 corresponds to the juncture of the shots A, B, C, D, E, and F.

Figure 8A:
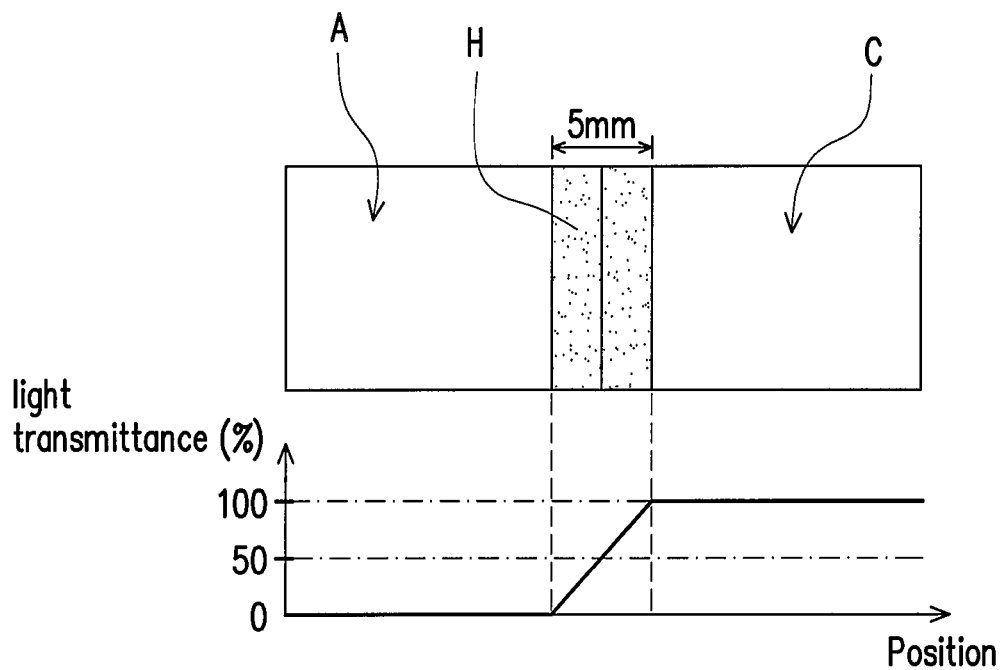
FIG. 8A is a schematic view of the buffer film layer and the optical effect thereof according to the present invention.
Figure 8B:
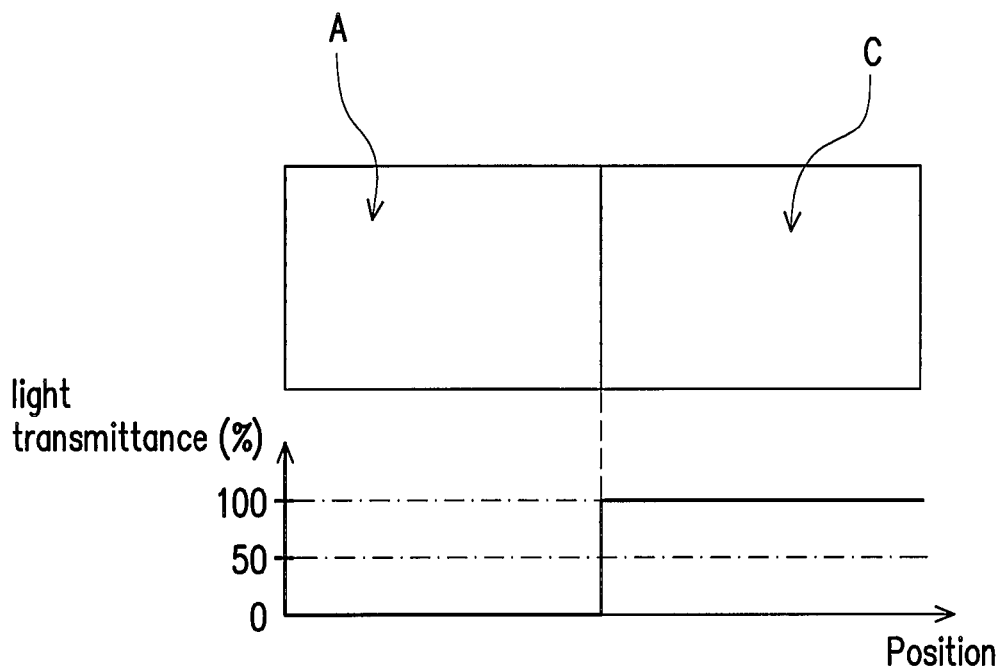
FIG. 8B is a schematic view of the optical effect of the liquid crystal display panel without the buffer film layer according to the present invention.

FIG. 8A is a schematic view of the buffer film layer and the optical effect thereof according to the present invention. FIG. 8B is a schematic view of the optical effect of the liquid crystal display panel without the buffer film layer according to the present invention. Referring to FIGS. 8A and 8B, in order to make the liquid crystal display panel 200 have a better display quality, the liquid crystal display panel 200 of the present invention further comprise a buffer film layer H, and the buffer film layer H is disposed between any two adjacent shots of A, B, C and D.

For example, if the buffer film layer H is disposed between the shots A and C, the buffer film layer H can effectively prevent a large drop of the overall energy (as shown in FIG. 8A), thereby further enhancing the display effect. On the contrary, if there is no buffer film layer H, the juncture between the shots A and C may have apparent energy drop (as shown in FIG. 8B). In particular, the total width of the buffer film layer H is, for example, 5 mm, which can be appropriately adjusted as required. Moreover, the material of the buffer film layer H can be N-type doped amorphous silicon. In practice, the buffer film layer H can be selectively fabricated together with the channel layer. Definitely, the buffer film layer H can also be made by other suitable materials, and it is not intended to be limited herein.

In view of the above, as the opposite substrate of the present invention has a plurality of patterned electrodes disposed thereon and the patterned electrodes can be selectively connected to different reference voltages to adjust the voltage differences generated between the patterned electrodes and the pixel electrode. Therefore, even if the quantity of the electric charges of the pixel electrode is different after being charged, the voltage difference between the pixel electrodes in different shots and the patterned electrodes can be made consistent by adjusting the value of the reference voltage, thereby effectively controlling the liquid crystal molecules. As such, the liquid crystal display panel of the present invention can effectively eliminate the mura phenomenon of the display frame, thereby enhancing the display quality.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A liquid crystal display panel, comprising:
 an active device array substrate, comprising:
  a substrate, having a plurality of shots;
  a plurality of scan lines, disposed on the substrate;
  a plurality of data lines, disposed on the substrate;
  a plurality of pixel units, arranged on the substrate in an array;

an opposite substrate, disposed above the active device array substrate;
a plurality of patterned electrodes, respectively disposed on the opposite substrate, wherein the juncture of at least a portion of the shots corresponds to the juncture of the patterned electrodes; and
a liquid crystal layer, disposed between the patterned electrodes and the active device array substrate.

2. The liquid crystal display panel as claimed in claim 1, wherein the patterned electrodes are respectively connected to different reference voltages.

3. The liquid crystal display panel as claimed in claim 2, further comprising a plurality of conductive paste dots, disposed on the side edges of the patterned electrodes, wherein the patterned electrodes are electrically connected to an external circuit via the conductive paste dots.

4. The liquid crystal display panel as claimed in claim 3, wherein the material of the conductive paste dots is silver paste or carbon paste.

5. The liquid crystal display panel as claimed in claim 1, wherein each of the pixel units comprises at least one active device and a pixel electrode, and the pixel electrode is electrically connected to the corresponding scan line and corresponding data line via the active device.

6. The liquid crystal display panel as claimed in claim 1, wherein the opposite substrate further comprises:

a base;
a black matrix, disposed on the base, wherein the black matrix has a plurality of lattice points; and
a plurality of color filter thin films, disposed on the base and respectively in the lattice points.

7. The liquid crystal display panel as claimed in claim 6, wherein the material of the color filter thin films comprises red, blue or green resins.

8. The liquid crystal display panel as claimed in claim 1, wherein the opposite substrate is a transparent substrate.

9. The liquid crystal display panel as claimed in claim 8, further comprising a color filter, disposed on the active device array substrate, wherein the liquid crystal layer is disposed between the color filter and the opposite substrate.

10. The liquid crystal display panel as claimed in claim 1, wherein the material of the patterned electrodes comprises indium tin oxide (ITO), indium zinc oxide (IZO), or aluminum zinc oxide (AZO).

11. The liquid crystal display panel as claimed in claim 1, further comprising a buffer film layer disposed between two shots.

12. The liquid crystal display panel as claimed in claim 11, wherein the material of the buffer film layer comprises N-type doped amorphous silicon.

* * * * *